No. 844,319. PATENTED FEB. 19, 1907.
A. M. BOLLINGER.
BOY'S WAGON.
APPLICATION FILED OCT. 29, 1906.

WITNESSES:

Alexander M. Bollinger
INVENTOR

By C. A. Snow & Co.
ATTORNEYS

UNITED STATES PATENT OFFICE.

ALEXANDER M. BOLLINGER, OF LEECHBURG, PENNSYLVANIA.

BOY'S WAGON.

No. 844,319.  Specification of Letters Patent.  Patented Feb. 19, 1907.

Application filed October 29, 1906. Serial No. 341,158.

*To all whom it may concern:*

Be it known that I, ALEXANDER M. BOLLINGER, a citizen of the United States, residing at Leechburg, in the county of Armstrong and State of Pennsylvania, have invented a new and useful Boy's Wagon, of which the following is a specification.

This invention relates to vehicles or wagons of that general class especially designed for use by children and other persons and adapted to be propelled by the occupant of the vehicle.

The object of the invention is to provide a comparatively simple and inexpensive vehicle having a hand-lever pivotally mounted for lateral movement on the supporting-frame and operatively connected with the driving mechanism, whereby motion may be transmitted to the rear axle of the vehicle when the hand-lever is operated.

A still further object of the invention is to generally improve this class of devices, so as to increase their utility, durability, and efficiency.
With these and other objects in view the invention consists in the construction and novel combination and arrangement of parts hereinafter fully described, and illustrated in the accompanying drawings, it being understood that various changes in form, proportions, and minor details of construction may be resorted to within the scope of the appended claims.

Figure 1:
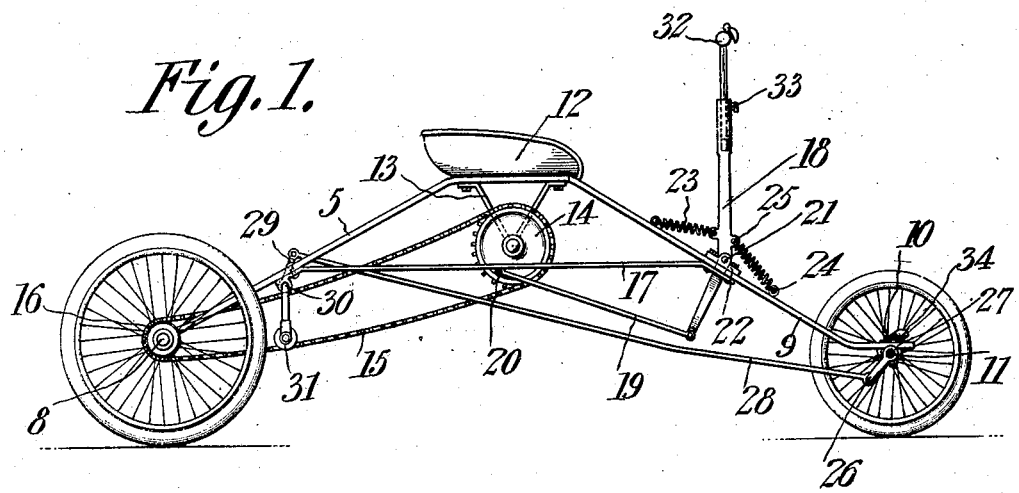
Figure 2:
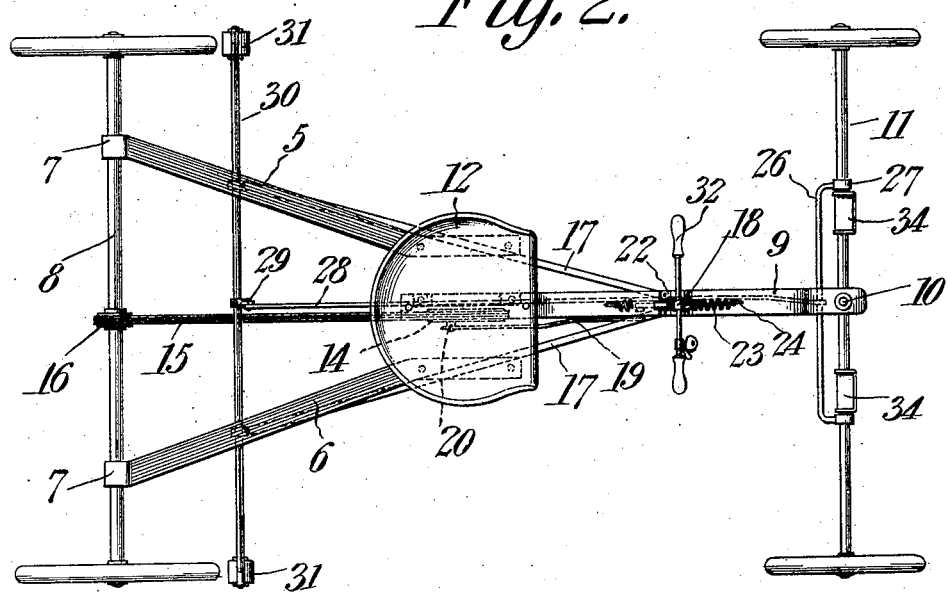

In the accompanying drawings, forming a part of this specification, Figure 1 is a side elevation of a wagon constructed in accordance with my invention. Fig. 2 is a top plan view of the same.

Similar numerals of reference indicate corresponding parts in all of the figures of the drawings.

The vehicle consists of a substantially triangular supporting-frame, consisting of the converging rear bars 5 and 6, provided with terminal bearings 7 for the reception of the rear axle 8, and the front bar or reach 9, pivotally connected at 10 to the front axle 11.

The front and rear bars of the supporting-frame are bent or bowed upwardly and riveted or otherwise rigidly secured to the bottom of the seat 12. Depending from the seat 12 is a hanger 13, in which is journaled a sprocket-wheel 14, the latter being connected by a sprocket-chain 15 with a similar sprocket-wheel 16, mounted on the rear axle, as shown. The front and rear bars of the supporting-frame are preferably formed of metal and are reinforced and strengthened by diagonal brace-rods 17, which extend longitudinally of the frame and are riveted or otherwise secured to the rear bars and front bar, respectively.

The front bar 9 of the supporting-frame is provided with an elongated opening for the reception of a hand-operated lever 18, the lower end of which projects through said opening and is connected, by means of a pitman-rod 19, with the crank-pin 20 of the sprocket-wheel 14. The lever 18 is provided with laterally-extending trunnions or pins 21, pivotally mounted in bearings 22, secured to the reach or bar 9, whereby when the lever 18 is reciprocated motion will be imparted to the sprocket-wheel 14 and thence, through the medium of the sprocket-chain 15, to the rear axle of the vehicle.

The lever 18 is normally and yieldably supported in vertical position by means of coiled springs 23, one end of each of which is secured to an eye or loop 24, carried by the reach 9, while the opposite end thereof is secured to suitable perforated lugs 25, extending laterally from the opposite sides of the lever 18.

The springs 23 not only assist in returning the lever 18 to vertical position after each oscillation of the same, but also serve to prevent the crank-pin from stopping on dead-center.

Depending from the front axle 11 is a foot rail or rod 26, the opposite ends of which are provided with terminal bearings 27 for the reception of said axle. Secured to the central portion of the rod 26 is a rearwardly and upwardly extending rod 28, the adjacent end of which is connected to an arm 29, carried by the rock-shaft 30, the latter being provided with terminal depending brake-shoes 31, adapted to bear against the rear wheels of the vehicle when the foot rail or rod 26 is depressed.

The operating-lever 18 is provided with a vertically-adjustable handle-bar 32, seated in a socket formed in said lever, there being a set-screw 33 piercing the walls of the lever for locking the handle-bar in adjusted position.

In operation the occupant of the vehicle rests his feet on the foot-supports 34 and reciprocates or oscillates the handle-bar 32, thus transmitting motion to the rear axle 8 and propelling the vehicle. By having the foot-rail 26 arranged beneath the foot-rests 34 the operator may readily apply the brakes without removing his feet from said rests, while by reason of the pivotal connection between the rod 28 and the foot-rail 26 the brakes will be partially applied when making short turns, so as to prevent danger of upsetting the vehicle.

The vehicles may be made in different sizes and shapes and may be nickeled, japanned, or otherwise finished to give the same a neat attractive appearance.

From the foregoing description it will be seen that there is provided an extremely simple, inexpensive, and efficient device admirably adapted for the attainment of the ends in view.

Having thus described the invention, what is claimed is—

1. In a wagon, the combination with the front and rear axles, of a substantially triangular-shaped supporting-frame mounted on the axles, a seat secured to the apex of the supporting-frame, a hanger depending from the seat, a sprocket-wheel journaled in the hanger for transmitting motion to the rear axle, bearings carried by the supporting-frame, a hand-operated lever passing through an opening in the supporting-frame and provided with oppositely-disposed trunnions adapted to engage the bearings, a pitman connecting the sprocket-wheel with the adjacent end of the hand-operated lever, and oppositely-disposed springs secured to the frame and lever, respectively, for normally supporting the lever in vertical position.

2. In a wagon, the combination with the front and rear axles, of a supporting-frame comprising upwardly-extending converging rear bars and a single front bar overlapping the converging ends of the rear bars, a seat secured to the overlapped ends of said bars, a hanger depending from the seat, a sprocket-wheel journaled in the hanger for communicating motion to the rear axle, a hand-operated lever passing through an opening in the front bar and having its lower end pivotally connected to the sprocket-wheel, bearings secured to the front bar, trunnions extending laterally from the lever and journaled in said bearings, oppositely-disposed springs secured to the front bar and lever, respectively, for yieldably supporting the latter in vertical position, and a handle-bar mounted for vertical movement on the hand-operated lever.

In testimony that I claim the foregoing as my own I have hereto affixed my signature in the presence of two witnesses.

ALEXANDER M. BOLLINGER.

Witnesses:
GEO. W. THOMPSON,
C. F. ARMSTRONG.